United States Patent
Patel et al.

(10) Patent No.: US 10,356,565 B2
(45) Date of Patent: Jul. 16, 2019

(54) SYSTEM AND METHOD FOR SITUATIONAL AWARENESS DRIVEN GROUP COMMUNICATIONS

(71) Applicant: Kodiak Networks, Inc., Plano, TX (US)

(72) Inventors: Krishnakant M Patel, Richardson, TX (US); Brahmananda R Vempati, Dallas, TX (US); Lance Patrick Schlegel, Dallas, TX (US); Ramu Kandula, Plano, TX (US); Rohit Ashok Nerlikar, Richardson, TX (US); Harisha Mahabaleshwara Negalaguli, Richardson, TX (US)

(73) Assignee: KODIAK NETWORKS, INC., Plano, TX (US)

(\*) Notice: Subject to any disclaimer, the term of this patent is extended or adjusted under 35 U.S.C. 154(b) by 0 days.

(21) Appl. No.: 15/827,953

(22) Filed: Nov. 30, 2017

(65) Prior Publication Data

US 2018/0160277 A1    Jun. 7, 2018

Related U.S. Application Data

(60) Provisional application No. 62/428,986, filed on Dec. 1, 2016.

(51) Int. Cl.
| | |
|---|---|
| *H04W 4/10* | (2009.01) |
| *H04W 4/021* | (2018.01) |
| *H04W 28/16* | (2009.01) |
| *H04L 29/08* | (2006.01) |
| *H04W 4/08* | (2009.01) |
| *H04W 76/45* | (2018.01) |
| *H04W 28/24* | (2009.01) |

(52) U.S. Cl.
CPC .............. *H04W 4/10* (2013.01); *H04L 67/18* (2013.01); *H04W 4/021* (2013.01); *H04W 4/08* (2013.01); *H04W 28/16* (2013.01); *H04W 76/45* (2018.02); *H04W 28/24* (2013.01)

(58) Field of Classification Search
None
See application file for complete search history.

(56) References Cited

U.S. PATENT DOCUMENTS

| | | | | |
|---|---|---|---|---|
| 8,634,799 | B1 * | 1/2014 | Economy | .............. H04W 48/18 455/404.1 |
| 2010/0016008 | A1 | 1/2010 | Brewer et al. | |

(Continued)

FOREIGN PATENT DOCUMENTS

| | | |
|---|---|---|
| WO | 2016039579 A1 | 3/2016 |
| WO | 2016073461 A1 | 5/2016 |

*Primary Examiner* — Fayyaz Alam

(57) ABSTRACT

A method and apparatus for situational awareness driven group communications are provided. In an embodiment, a PTT server platform receives incident information related to an incident. The PTT server platform identifies members of a first response group for responding to the incident based on the incident information, and creates a PTT call group associated with the incident. The PTT server platform configures the client devices associated with the members of the first response group with the first set of QoS parameters, and enables communications among the client devices associated with the members of the first response group.

18 Claims, 12 Drawing Sheets

(56) References Cited

U.S. PATENT DOCUMENTS

2013/0136036 A1\* 5/2013 Chen .................. H04W 28/24
370/260
2015/0173107 A1\* 6/2015 Newberg ............. H04W 76/45
455/416

\* cited by examiner

SYSTEM AND METHOD FOR SITUATIONAL AWARENESS DRIVEN GROUP COMMUNICATIONS

CROSS-REFERENCE TO RELATED APPLICATIONS

The present application claims benefit under 35 U.S.C. § 119(e) from U.S. Provisional Patent Application commonly owned with this application by Kodiak Networks Inc.: Ser. No. 62/428,986, filed on Dec. 1, 2016, titled "System and Method for Situational Awareness Driven Group Communication System", the entire contents of which being incorporated herein by reference.

BACKGROUND OF THE INVENTION

Push-to-talk (PTT) platforms involve providing PTT functionality (e.g., call group management, call origination, call transmittal, talk-back call termination, floor management, filtering, etc.) through PTT clients on client devices. The PTT functions may be performed by one or more servers, and communications between the client devices and the servers may be performed over a telecommunications network (e.g., a carrier network).

Various systems may use the PTT devices. For example, incident management systems may utilize PTT devices for communications among the responders that handle an incident. However, conventional systems are not driven by situational awareness. As such, network resources for such communications are not optimized.

Accordingly, there is a need for systems and methods for situational awareness driven group communications to more efficiently utilize the network resources.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
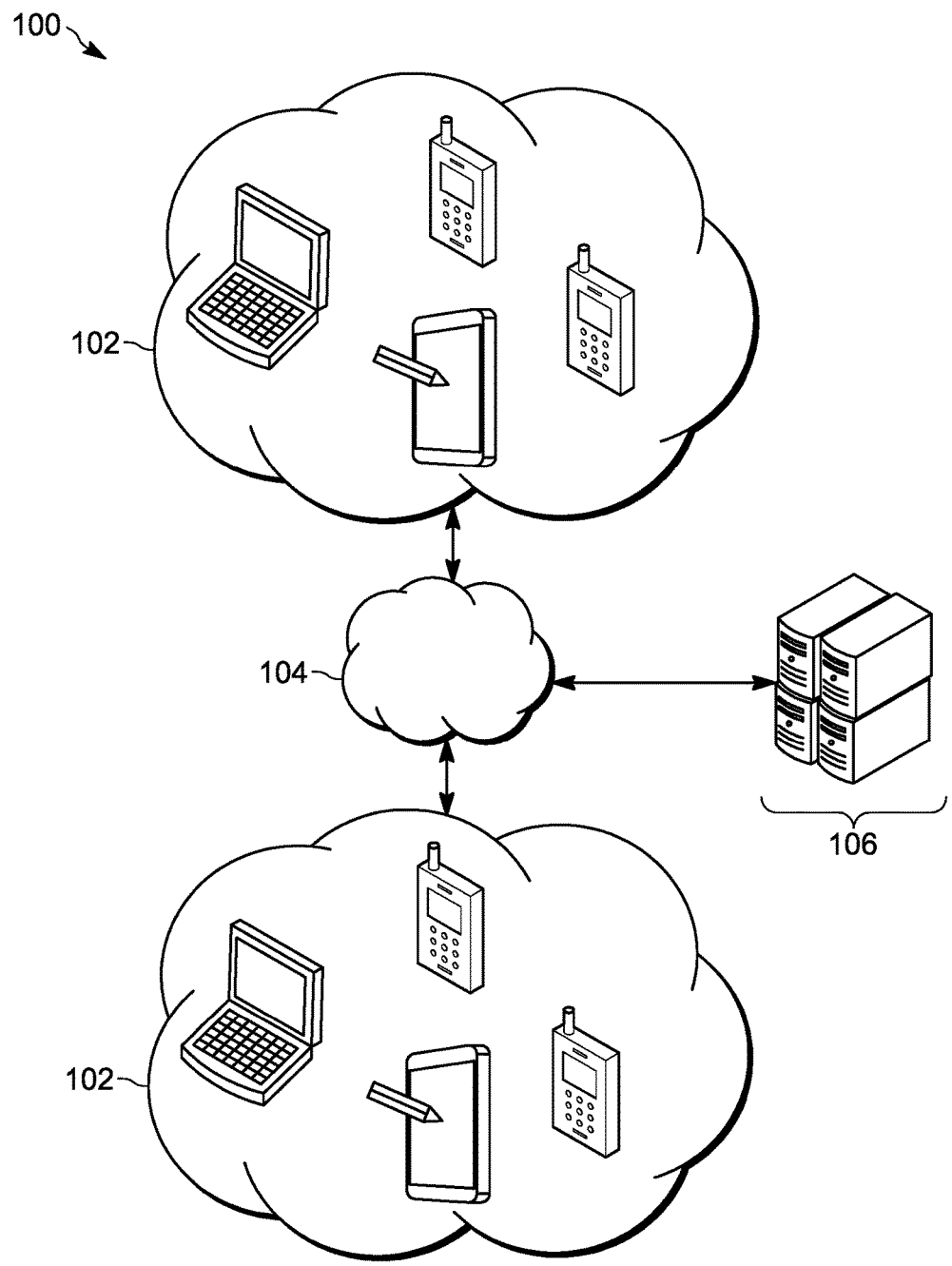
FIG. 1 illustrates architecture of a communications system for supporting a PTT communications solution in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

A method and apparatus for situational awareness driven group communication are provided.

In an embodiment, a PTT server platform receives incident information related to an incident. The PTT server platform may receive the incident information from one or more data sources via a transceiver of the PTT server platform. The incident information comprises incident type, incident status, and incident location.

The PTT server platform identifies members of a first response group for responding to the incident. The PTT server platform may identify members of the first response group based on the incident information and locations of client devices associated with the members of the first response group.

The PTT server platform creates a PTT call group associated with the incident. The PTT server platform creates the PTT call group for the client devices associated with the members of the first response group. The PTT server platform then identifies a first set of quality of service (QoS) parameters. The PTT server platform may identify the first set of QoS parameters for supporting communications associated with the incident. The PTT server platform also determines that a current set of QoS parameters are configured at the client devices associated with the members of the first response group. The current set of QoS parameters may be at a different priority level than the first set of QoS parameters.

Next, the PTT server platform configures the client devices associated with the members of the first response group with the first set of QoS parameters. Then, the PTT server platform enables communications among the client devices associated with the members of the first response group.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions, and alterations can be made herein without departing from the spirit and scope of this disclosure as defined by the appended claims.

Various embodiments are described within a specific context, namely, adaptations for high latency networks such as a network in a push to talk (PTT) system. QoS settings may be configured to ensure that the client devices of the first responders have higher priorities for the network resources during an incident and that the client devices of other users of the network may be pre-empted to make sufficient network resources available to the first responders. It is also possible that the system may reduce the priority level for the client devices of some users and elevate the priority for the client devices of other users as the situation evolves. Various embodiments may, however, be applied to other systems and networks where adaptations for high latency networks is desirable. For example, the concepts described in this disclosure are applicable to any group communications services including group messaging and group video. Further, in one example embodiment, PTT, messaging, and video communications may be used concurrently in the context of an incident response.

FIG. 1 illustrates a communications system 100, which provides architecture for supporting a PTT communications solution in accordance with some embodiments. Communications system 100 includes client devices 102, a communications network 104, and a PTT platform 106. As used herein, the term "client device" refers to any component (or collection of components) capable of establishing a connection with a communications network, such as a user equipment (UE), a mobile station (STA), a cellular phone, a tablet, a laptop, and other wired/wirelessly enabled devices. Applications (referred to hereinafter as "PTT clients") reside on client devices 102 for accessing various PTT functions.

Client devices 102 may communicate with PTT platform 106 over network 104, which may be accessed by client devices 102 through a cellular network deployed by a carrier, a WiFi network, a radio access network (RAN), other wireless networks, a wired internet protocol (IP) network, combinations thereof, or the like. Network 104 may include one or more components configured to provide wireless or wired network access, such as an enhanced base station (eNB), a macro-cell, a femtocell, a Wi-Fi access point (AP), combinations thereof, or the like. Furthermore, network 104 may operate in accordance with one or more wireless communication protocols, e.g., open mobile alliance (OMA), long term evolution (LTE), LTE advanced (LTE-A), High Speed Packet Access (HSPA), Wi-Fi 802.11a/b/g/n/ac, etc. In some embodiments, network 104 may comprise various other devices, such as relays, low power nodes, etc. Network 104 may further include backhaul network components, such as various gateways, routers, controllers, schedulers, and the like.

In an embodiment where PTT platform 106 is a PTT-over-Cellular (PoC) platform, subscribers to a PTT solution (e.g., users operating client devices 102) may be provisioned onto system 100 via interfaces to carriers (e.g., cellular carriers). The POC platform may include other group communication services such as group messaging and group video. PTT customers (e.g., enterprises) can administer these subscribers to form closed groups for PTT communications. The PTT solution may interface with the carrier, for example, by including connectivity to the carrier's core network, billing interfaces, provisioning interfaces, lawful intercept interfaces, customer care interfaces, and the like. PTT platform 106 may provide a plurality of PTT functions to client devices 102 through the PTT clients on client devices 102 as described in greater detail below.

In some embodiments, PTT platform 106 uses container technology for virtualization of the PTT system architecture, such as, the virtualization of provided PTT services. Example container technologies may include Docker, Rocket, LXD, and the like although the architecture is not limited to a specific container technology. Virtualization using container technology may allow PTT platform 106 to adopt a micro-services model in which service clusters are considered the building blocks of the system architecture. For example, each function provided by PTT platform 106 may be virtualized in a unique service cluster, and each service cluster may perform a different function in PTT platform 106. Service clusters are hosted on virtual machines of an embodiment cloud network. An embodiment cloud network may include a plurality of geographically diverse deployment sites (e.g., data centers) where various virtual machines are physically deployed. Decomposition of the system into a set of services allows each service (e.g., each function provided by the PTT platform) to be independently deployed and managed. Thus, system resilience may be improved as failures are localized to individual services. Furthermore, rapid and agile deployment of services may also be achieved.

In some embodiments, PTT platform 106 incorporates distributed databases, clustering technologies, data analytics tools, and messaging middleware to provide a robust, scalable platform. PTT platform 106 may use fully virtualized components with a layered approach to service orchestration, which allows PTT platform 106 to be integrated into various cloud environments, such as a carrier's private cloud infrastructure, a dedicated PTT cloud infrastructure, combinations thereof, and the like. Other telecommunication services platforms, including other PTT platforms, may be used in other embodiments.

As used herein, situational awareness refers to the ability to continuously perceive or receive relevant contextual information in a timely manner, use this information for making effective decisions, and act proactively to increase the likelihood of achieving desired outcomes. Situational awareness may be applied in the context of human experience.

In some embodiments, situational awareness may be a factor for success and safety of the first responders dealing with an incident. For example, situational awareness for first responders may enhance the perception of environmental factors by the first responders and other field personnel through the use of various sensors and/or audio-visual aids to provide information such as maps, floor plans, video streams, images, and other multimedia content that may be relevant to the situation. In some embodiments, situational awareness may also aide dispatchers/command center during an incident. For example, situational awareness may be used by a dispatch/command center in order to identify, deploy, and coordinate resources for an effective incident response. Dispatcher may be responsible for identifying and enabling communication paths between various entities involved in the incident's response. Typically, in conventional Incident Management Systems, dispatchers perform this task manually as the system does not have situational awareness capability.

Various embodiment implementations provide a mechanism for dispatch to be aware of which personnel are best suited to attend to an emergency as soon as a public safety answering points is made aware of the emergency. If public safety personnel are tied into the situational awareness engine, the public safety personnel may receive automatic alerts based on their location and proximity to the on-going emergency. Once personnel acknowledge the alert, they may participate in the incident response.

For example, in a scenario relating to a fire in a city dwelling, a public safety answering point (PSAP) may receive a call regarding the fire incident. The PSAP may set up a geo-fence around the reported incident (e.g., a perimeter around the city dwelling). Dispatch may notify relevant client devices of emergency personnel located in the area regarding the incident (including the location and the geo-fence definition). The client devices around the area may make a local decision on whether the client devices are inside the geo-fence definition and determine whether to join the incident response group dynamically (e.g., join a group call session, group multimedia session, etc.). The client devices within the incident response group may participate in all communication in the incident response group and receive instructions from an incident commander. The client devices in the incident response group may automatically receive relevant data from static data sources and/or dynamic data feeds regarding the incident.

Various embodiments describe a group communication system providing situational awareness based on information received from one or more sources that may be external or internal to the system. The situational awareness system is applied to achieve of a number of objectives. The system may identify and retrieve relevant information from a variety of static data sources and/or live data feeds. The system may identify the entities to receive the retrieved information and deliver the information to these client devices corresponding to relevant entities (e.g., emergency personnel), thereby improving the situational awareness for the entities. The system identifies group and 1-1 communication paths pertaining to the situation and perform actions to facilitate this communication. The actions may include setting up groups, assigning roles and priorities to client devices of various entities involved in the communication, and/or allocating or reserving the resources required for the communication. Group communication system(s) may be a component of Public Safety Incident Management Systems.

Figure 2:
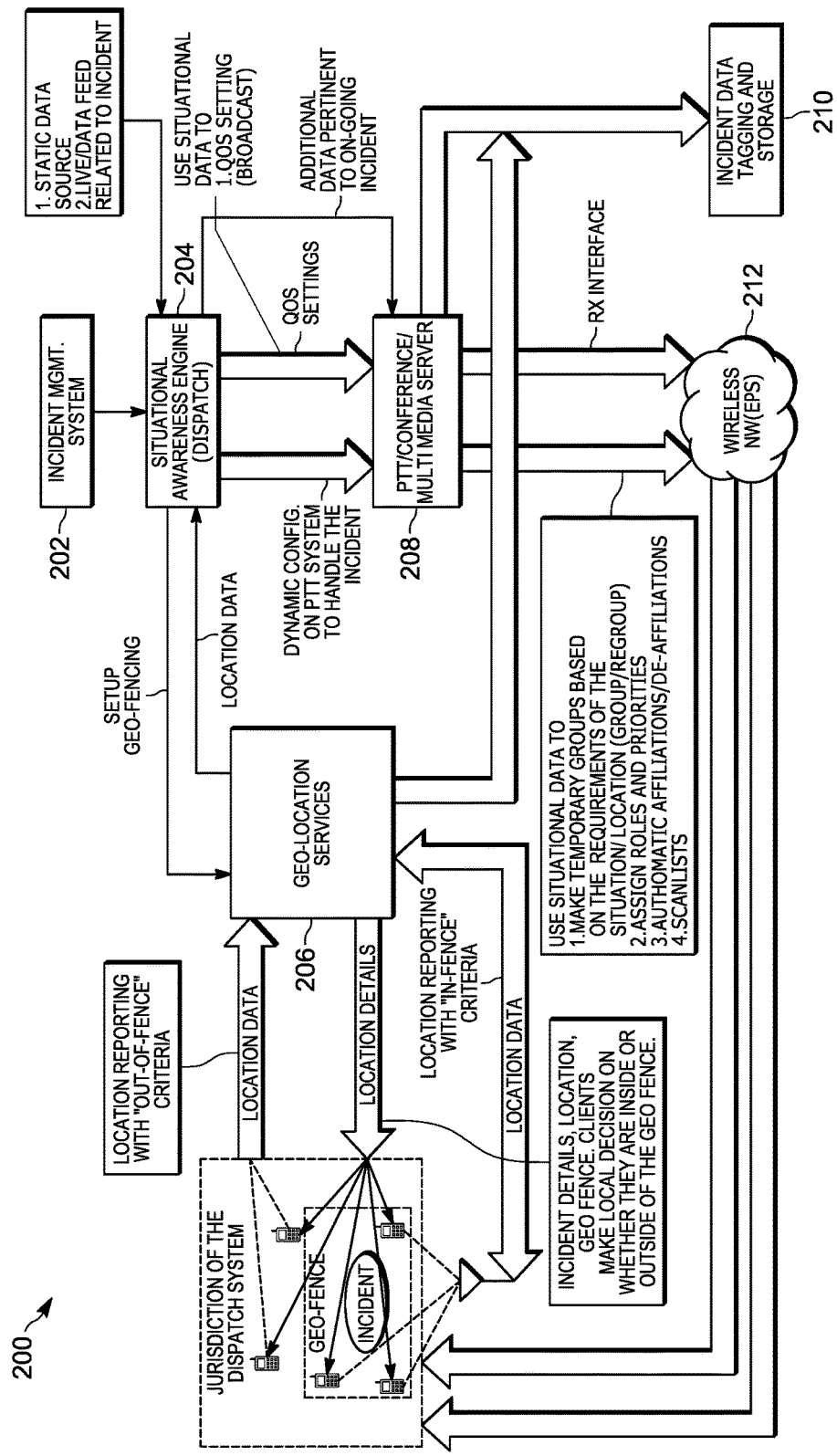
FIG. 2 illustrates an embodiment system.

FIG. 2 illustrates an embodiment system 200. Embodiment system 200 may include Incident Management System 202, Situational Awareness Engine 204, Geo Location Server 206, Group Communication System 208, Incident Data Tagging and Storage 210, and Wireless Network 212. When an incident occurs, Incident Management System 202 communicates to Situational Awareness Engine 204 with incident information, and Situational Awareness Engine 204 may receive data related to the incident from static data sources and/or from live data feeds.

Situational Awareness Engine 204 may communicate to Geo Location Server 206 to set up geo-fencing. Geo Location Server 206 may send incident details to PTT client devices within the jurisdiction of the dispatch system. The incident details may include location of the incident, information about the geo-fence (e.g., a pre-determined size of the geo-fence), combinations thereof, or the like. The pre-determined size of the geo-fence may be incident specific. A client device may make local decisions on whether the device is inside or outside the geo-fence. For client devices outside the geo-fence, the devices report the "out-of-fence" information to Geo Location Server 206. For client devices inside the geo-fence, the devices report the "in-fence" information to Geo Location Server 206. Geo Location Server 206 may send the received location data of the client devices to Situational Awareness Engine 204.

Situational Awareness Engine 204 may communicate to Group Communication System 208 to dynamically configure the PTT system to handle the incident. For example, Situational Awareness Engine 204 may determine a set of QoS settings based on the incident information. Situational Awareness Engine 204 may send QoS settings to Group Communication System 208 for broadcast in Wireless Network 212. Situational Awareness Engine 204 may also send additional data pertinent to the on-going incident to Group Communication System 208. Group Communication System 208 may be implemented on one server, or on multiple servers (e.g., a first server for the PTT system, a second server for the conference system, and a third server for the multimedia system). Group Communication System 208 may use situational data to make temporary groups based on the requirements of the incident. Group Communication System 208 may assign roles and priorities (e.g., by applying a specific QoS setting defined by Situation Awareness Engine 204) to client devices of members of a temporary PTT group. Group Communication System 208 may automatically affiliate or de-affiliate members of a temporary PTT group. Further, Group Communication System 208 may add, delete, or prioritize channels or temporary groups in a scan list. Incident Data Tagging and Storage 210 may tag all communications, with an incident identifier (ID) for example, and log the tagged communications in a storage device for later retrieval.

Figure 3:
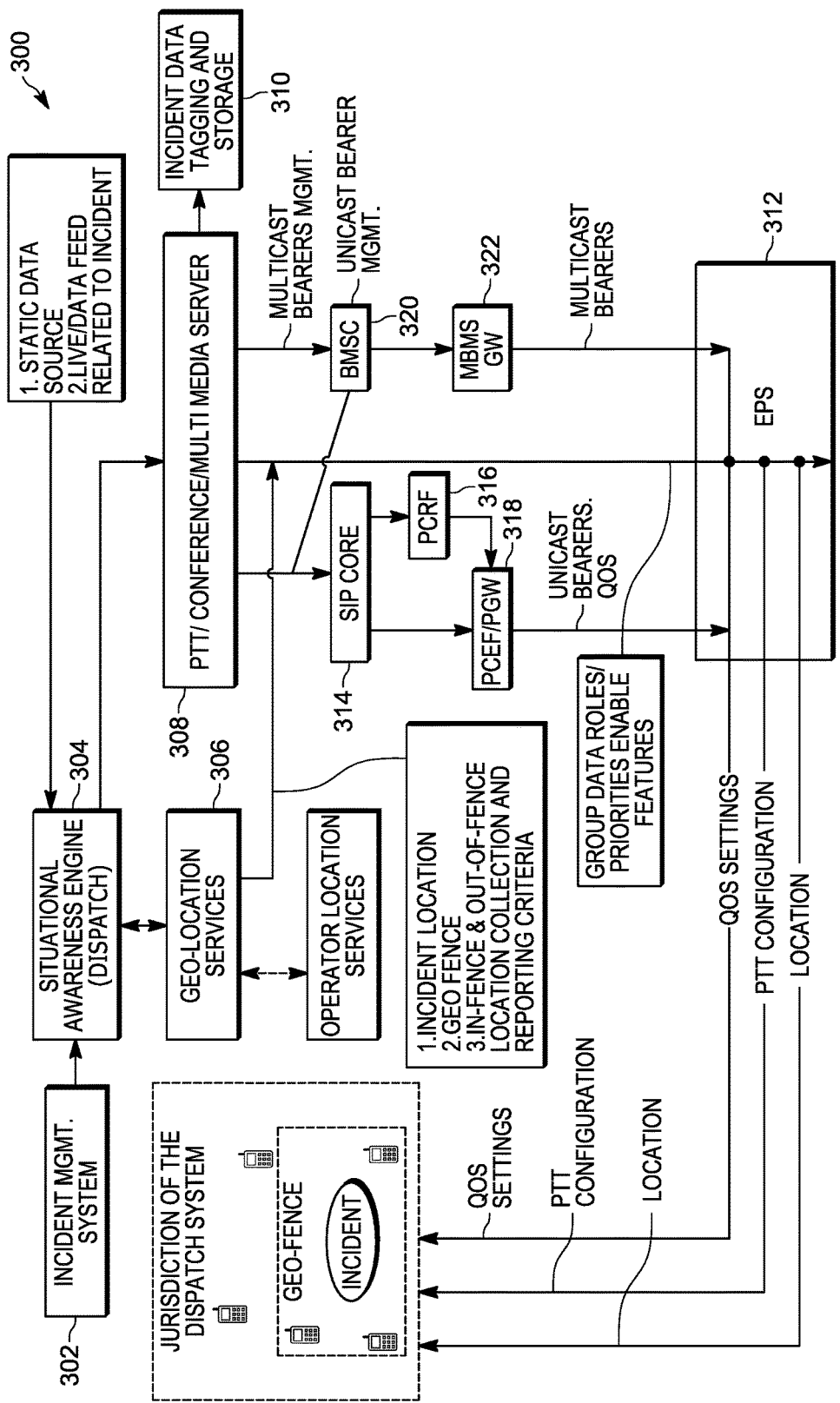
FIG. 3 illustrates an embodiment realization of a system on a LTE network.

FIG. 3 illustrates an embodiment realization of a system 300 on a LTE network. Embodiment system 300 may utilize one or more of the following non-limiting components/features, including Incident Management System 302, Situational Awareness Engine 304, Geo Location Server 306, and Group Communication System 308 capable of delivering audio, video, and multimedia messaging services. Group Communication System 308 may be implemented on one server, or on multiple servers (e.g., a first server for the PTT system, a second server for the conference system, and a third server for the multimedia system). System 300 may also include a wireless network with priority and preemption capability (not shown in FIG. 3).

Incident Management System 302, Situational Awareness Engine 304, Geo Location Server 306, and Group Communication System 308 are similar to Incident Management System 202, Situational Awareness Engine 204, Geo Location Server 206, and Group Communication System 208, respectively, described above with respect to FIG. 2. Further, and Group Communication System 308 may communicate to Session Initiation Protocol (SIP) Core 314 to dynamically establish a dedicated bearer in evolved packet system (EPS) 312 for the PTT bearer by configuring Policy and Charging Rules Function (PCRF) 316, and may do so using a standard interface such as the Rx reference point. An Rx reference point may be the interface between a PCRF and an application server in 3GPP LTE networks for performing the QoS, priority, and preemption control.

Group Communication System 308 may communicate to SIP Core 314 and Policy and Charging Enforcing Function (PCEF)/PGW 318 with QoS settings for the unicast bearers. The PCEF is typically co-located with Packet Gateway (PGW) function. The QoS settings may be configured by Situational Awareness Engine 304. SIP Core 314 may manage unicast bearers. Group Communication System 308 may also send multicast management information to Broadcast-Multicast Service Center (BMSC) 320 and Multimedia Broadcast Multicast Services (MBMS) Gateway (GW) 322. MBMS is a point-to-multipoint interface specification in 3GPP cellular networks, which is designed to provide efficient delivery of broadcast and multicast services, both within a cell as well as within the core network. BMSC is a part of a MBMS system that provisions the multicast bearers and provides the source stream for transmission. A group communication system may direct the BMSC to setup the required multicast channels and provides the content stream to BMSC for delivery. A MBMS GW may deliver a single content stream provided by BMSC to one or more cell sites using the IP multicast. EPS 312 may receive information about the multicast bearers from MBMS GW 322. Group Communication System 308 may further send configuration data, such as group data, roles and priorities of the members, and enabled features, to EPS 312. EPS 312 may send the QoS settings, PTT configuration information, and location information to client devices within the jurisdiction of the dispatch system.

An embodiment Incident Management System 302 may comprise interfaces that enable detection and logging of information relating to an incident. Information relating to the incident may include location of the incident, time of occurrence, type of incident, severity of the incident, special requirements to deal with the incident (bio hazard, etc.), and combinations thereof, or the like. Incident Management System 302 also provides triggers to Situational Awareness Engine 304 about the occurrence of an incident.

An embodiment Situational Awareness Engine 304 is a rule driven controller function, which may perform one or more of the non-limiting functions described herein. Situational Awareness Engine 304 may receive incident reports from Incident Management System 302. Situational Awareness Engine 304 may apply analytics to categorize the incident report and map the categorized incident report to an appropriate incident response plan (also referred to as incident information). In one embodiment, the incident response plans may be pre-configured by operators and stored in a databased accessible by Situational Awareness Engine 304.

Situational Awareness Engine 304 may identify personnel to involve in the incident response in accordance with the incident response plan (i.e., the incident information) Identification of the personnel to involve in the incident response may include, one or more of the following non-limiting functions: (1) determining the type and the number of personnel required to handle the incident based on the incident type (e.g., as defined in the incident response plan); (2) setting up a geo-fence around the incident coordinates (e.g., based on parameters defined in the incident response plan); and (3) determining the type and the number of secondary response personnel (nearby hospitals, etc.) desired to handle the incident based on the incident type (e.g., as defined in the incident response plan). The geo-fence represents a virtual perimeter of the zone from which first responders are activated for the incident response, and the incident response plan may define a size of the virtual perimeter based on the incident type. All first response personnel whose client devices are currently present inside the incident perimeter or enter the incident perimeter subsequently are considered candidates to be part of the incident response. If the number of first response personnel is found to be insufficient in the initial perimeter, Situational Awareness Engine 304 may widen the first response perimeter in accordance with the incident response plan.

Situational Awareness Engine 304 may automatically set up the communication paths for executing the incident response plan. Setting up communication paths may include one or more of the non-limiting functions described herein. Situational Awareness Engine 304 may create temporary call groups and/or group/re-group client devices corresponding to the personnel. Situational Awareness Engine 304 may automatically affiliate the personnel to the groups that the personnel need to participate in (e.g., as defined by the incident response plan). Situational Awareness Engine 304 may de-affiliate client devices from the groups that are not relevant to the current situation that the users of the client devices are handling. Situational Awareness Engine 304 may map the personnel to their respective roles and configure the priority and privilege settings of the client devices corresponding to the personnel accordingly (e.g., as defined by the incident response plan). Situational Awareness Engine 304 may set up and reserve broadcast resources on the wireless network (e.g., as defined by the incident response plan).

Further, Situational Awareness Engine 304 may identity static data sources and/or dynamic data feeds that are relevant to the current situation and trigger the group communication system to deliver the static data and/or dynamic data to the personnel involved in the incident response.

An embodiment Group Communication System 308 receives inputs from Situational Awareness Engine 304 to fulfill one or more of the non-limiting functions described herein. Group Communication System 308 may create temporary groups based on the type of incident and location of the client devices of the available personnel. Group Communication System 308 may create roles and priorities for the group members. Group Communication System 308 may identity the talk groups that the various users involved in the incident response need to be a part of and automatically affiliate/de-affiliate the client devices belonging to the users accordingly. Group Communication System 308 may configure talk group scan lists. Group Communication System 308 may push the group related data to relevant client devices. Group Communication System 308 may communicate with the carrier network over Rx interface to provide appropriate quality of service (QoS) settings for unicast bearers. Group Communication System 308 may communicate with the carrier network BMSC to configure the use of broadcast channels (if available) with appropriate QoS settings. Group Communication System 308 may deliver the data from static data sources and/or dynamic data feeds identified by the situational awareness engine to the client devices of personnel involved in the incident response.

An embodiment Geo Location Server 306 receives inputs from Situational Awareness Engine 304 to provide one or more of the non-limiting functions described herein. Geo Location Server 306 may setup a geo-fence around the incident. Geo Location Server 306 may provide the geo-fence details to the client devices within the jurisdiction. Geo Location Server 306 may provide the "in-fence" and "out-of-fence" location collection criteria. Geo Location Server 306 may provide the "in-fence" and "out-of-fence" location reporting criteria. Geo Location Server 306 may feed the location data of client devices back to the Situational Awareness Engine 304.

Embodiment static data sources may include city maps, building plans, police records, and the like, and may use Open Data Exchange to retrieve such data. Embodiment live data feeds may include audio, video, sensor data feeds, such as drone video feeds, traffic cameras, and the like. In some embodiments, the live data feeds may correspond to surveillance equipment within a geo-fence configured for a specific incident.

An embodiment method may incorporate initial trigger incident report(s), supplementary incident report(s), and situational awareness data collected implicitly by the system. For example, the collected data may include location data, emergency triggers activated manually by the user, and emergency triggers activated automatically by a sensor on the field device (e g, "man down" detection), and the like.

An embodiment method may check the type of response required by the incident report, specify the actions triggered by incident report, and provide a group communication interface. For example, an embodiment method may create an automatic group of first responders as defined by the incident response plan and provide roles and priorities to the first responders (e.g. fire personnel having higher priority fire related emergency in a fire related emergency). An embodiment method may also perform automatic affiliations and de-affiliations of the groups and create group scan lists, and the like. An embodiment method may provide a geo-location server for setting up geo-fence around the incident, providing in-fence and out-of-fence location collection, reporting criteria to the geo location server, and the like. An embodiment method may provide compatibility with a wireless network including, for example, interwork with the wireless network and assigning the groups with requisite QoS settings depending on the incident.

An embodiment incident report may include the type of incident, the type(s) of first responders needed, the number of first responders needed, specialized equipment required to handle the incident. Embodiment live data feed and/or static data may include live A/V feed from the incident and static available data from the location of the incident. In some embodiments, the incident management system is responsible for detecting the initial occurrence and classification of an incident by heuristic methods or by manual entry. Incident management system is also responsible for detection and classification of subsequent events that are related to the initial incident. Once the Incident management system submits the incident report to the situational awareness engine, the situational awareness engine may map the incident report to a corresponding incident response plan and communicate with PTT system, the Geo Location Server, and the static and/or live data feed(s). Embodiments may monitor the following incident reports and check whether the incident is related to the ongoing incident or a new incident. Embodiments may validate to the response plan if the supplemental incident report changes any parameters of the incident. If validated, an embodiment method may make requisite changes to the response plan.

Figure 4:
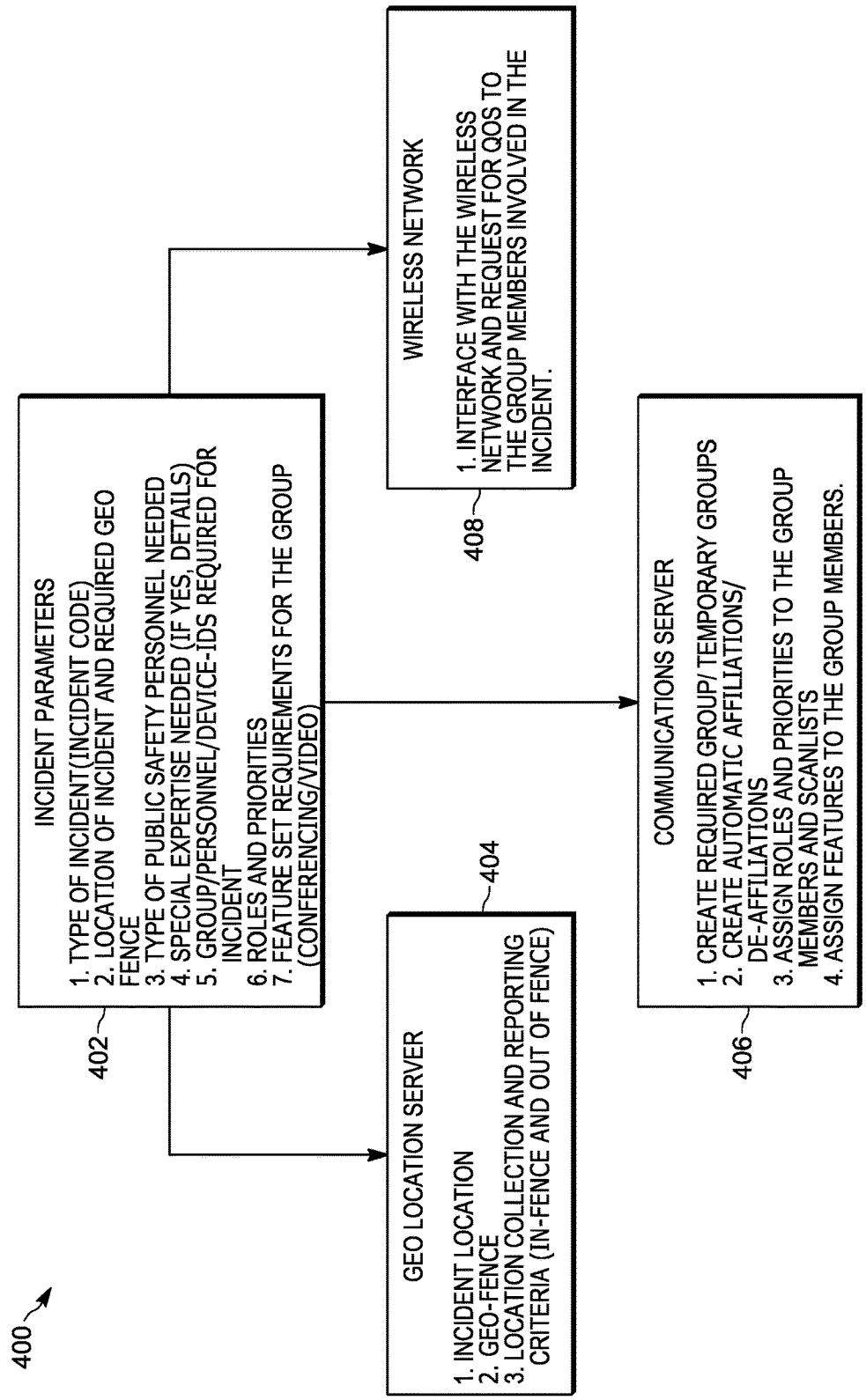
FIG. 4 illustrates an embodiment situational awareness rule template.

FIG. 4 illustrates an embodiment situational awareness rule template 400, which may be implemented to define an incident response plan. Situational awareness rule template 400 may include Incident Parameters 402, Geo Location Server 404, Communication Server 406, and Wireless Network 408. FIG. 4 depicts how the situational awareness engine translates the incident response plan into specific actions to control the geo-location server, the group communication server, and the wireless network.

Figure 5:
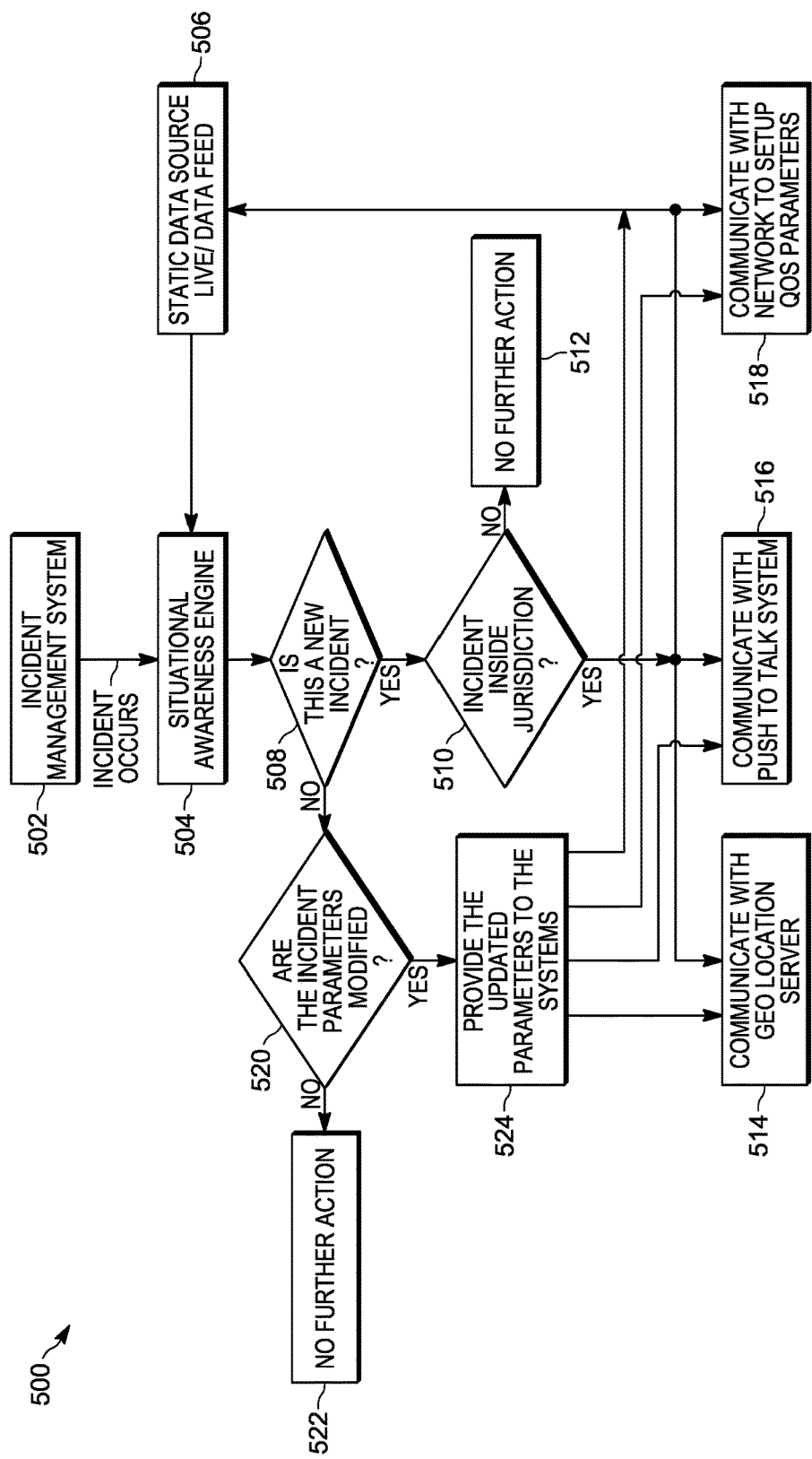
FIG. 5 illustrates an embodiment flow diagram for handling incident trigger(s).

FIG. 5 illustrates an embodiment flow diagram 500 for handling incident trigger(s). After Incident Management System 502 detects that an incident occurs, Incident Management System 502 reports the incident to Situational Awareness Engine 504. Situational Awareness Engine 504 may also receive data relevant to the incident from static data sources and/or live data feeds 506. At block 508, Situational Awareness Engine 504 determines whether the reported incident is a new incident. If the incident is a new one, Situational Awareness Engine 504 determines whether the incident is within the jurisdiction of the dispatch system. If the incident is not within the jurisdiction of the dispatch system, there is no further action to be taken at block 512. If the incident is within the jurisdiction, Situational Awareness Engine 504 communicates with the geo location server at block 514 (e.g., to identify relevant personnel based on an appropriate incident response plan), communicates with the PTT system at block 516 (e.g., to configure/re-configure talk groups for the incident based on the incident response plan), and communicates with the network to set up QoS parameters at step 518 (e.g., to configure one or more priorities for the group as a whole or individual members of the group for the incident based on the incident response plan).

If, at block 508, Situational Awareness Engine 504 determines that the reported incident is not a new incident, Situational Awareness Engine 504 further determines whether the incident parameters have been modified at block 520. If no incident parameters have been modified, there is no further action to be taken at block 522. If any of the incident parameters has been modified, Situational Awareness Engine 504 provides the updated parameters to the systems at block 524, by communicating with the geo location server at block 514 (e.g., to identify relevant personnel based on an appropriate incident response plan), communicates with the PTT system at block 516 (e.g., to configure/re-configure talk groups for the incident based on the incident response plan), and communicates with the network to set up QoS parameters at step 518 (e.g., to configure one or more priorities for the group as a whole or individual members of the group for the incident based on the incident response plan).

An embodiment rule configuration and management interface may be configured through incident management system for handling dynamic changes to the rules. Incident management system may dynamically update rules as directed by the incident commander/dispatcher. The situational awareness engine function allows the Incident Management System to automatically create groups and send messages regarding the incident (e.g., alert participants about the salient points of incident through a Push-to-X message). The group may be identified by a unique identifier (e.g., Incident Number). All communication on this group is recorded and is tagged with the Incident Number to facilitate easy retrieval for post incident analysis. Various inputs into Group Creation from the incident management system (IMS), such as, Incident Number, Incident Type, Incident Location, Geo-fence (default for an incident category or explicit radius of interest), members to be included, and the like. For example, included members may be based on explicit membership (e.g., default list of members for the type/location of incident), and/or conditional membership (users dynamically included as a part of group). Also, members of a specific user profile (e.g., users who come within a geo-fence) may be automatically included when the users enter the area. Included members may also be members of a specific agency based on the incident type (EMS or hazmat). Further, members that belong to a user profile might be dropped when they leave the geo-fence area (for at least a certain time). Moreover, a group may be dissolved, for example, when the incident is closed or time based expiry occurs (e.g., after x number of hours/days following the incident open).

Embodiment group communication system APIs may create temporary groups based on the inputs from the situational awareness engine, assign roles and priorities to the group members (e.g., client devices of requisite personnel) based on the incident, activate features for the members involved in the incident, communicate with the network, provide QoS settings for the members involved in the incident, enable ambient listening, enable discrete listening, tag and securely store communication history related to the incident, transmit multimedia messages to individual client devices and groups, and/or transmit multimedia data feeds to individual client devices and groups.

Figure 6:
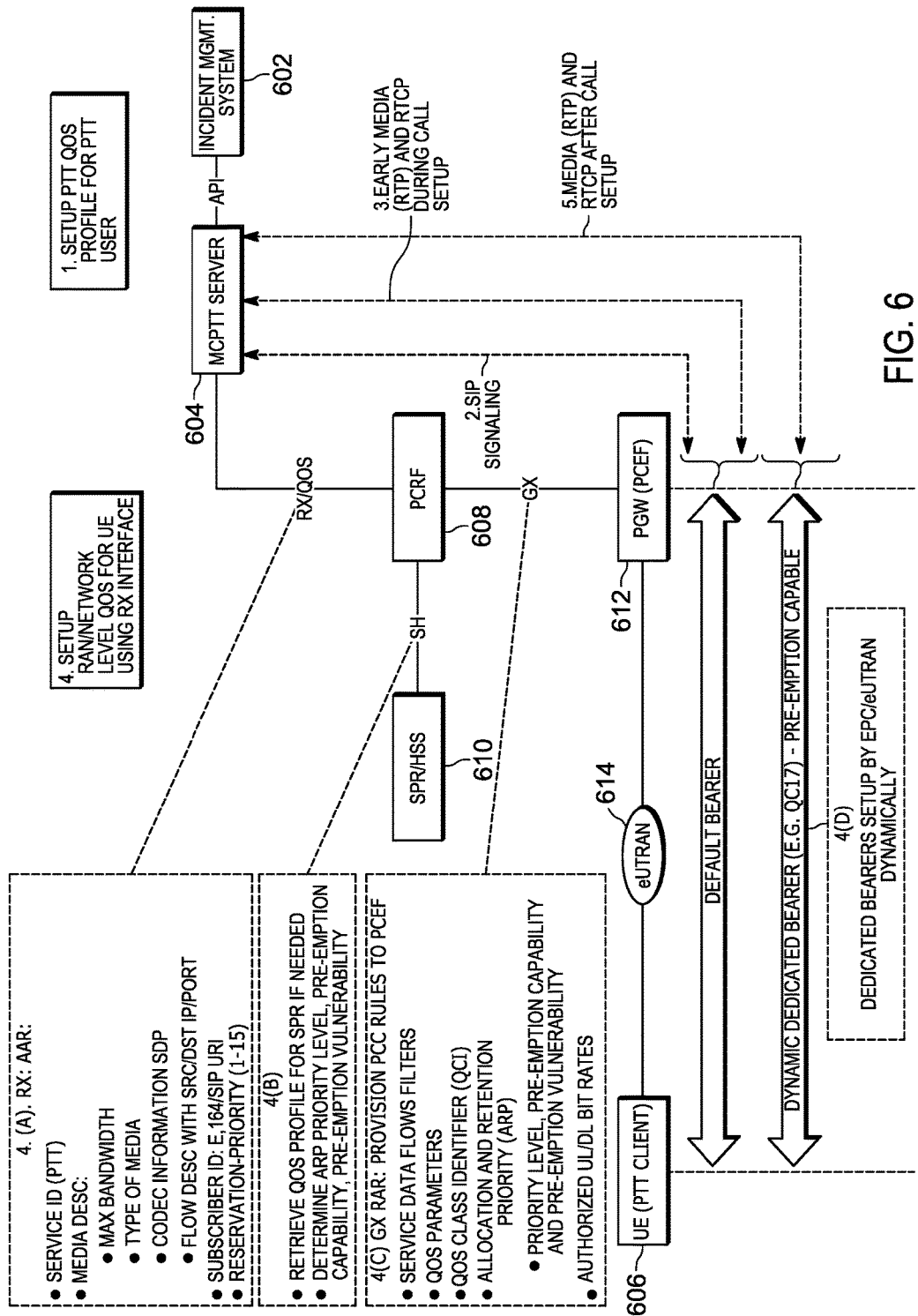
FIG. 6 illustrates embodiment for dynamic allocation of dedicated bearers for mission critical PTT (MCPTT) Calls.

In FIGS. 6-9, the "Incident Management System" component represents both the incident management system and the situational awareness engine functions described above. These two components have been combined into a single component in FIGS. 6-9 for the sake of brevity. FIG. 6 illustrates embodiment for dynamic allocation of dedicated bearers for mission critical PTT (MCPTT) Calls. Incident Management System 602 may use an API to communicate with MCPTT Server 604 to set up PTT QoS profile for a PTT user. The PTT user equipment (UE) 606 may initiate an MCPTT call via the SIP signaling between the UE and MCPTT Server 304. PTT UE 606 may use the default bearer during the call setup stage for early media using Real-time Transport Protocol (RTP) and RTP Control Protocol (RTCP).

Next, MCPTT Server 604 may use the Rx interface to set up RAN/network level QoS for UE 606. MCPTT Server 604 may send Authentication Authorization Request (AAR) information to PCRF 608. The AAR information includes a PTT service identifier, media description, subscriber id based on E.164 or based on a SIP URI, and a reservation priority. The media description may include maximum bandwidth, a type of the media, codec information from the session Description Protocol (SDP), and flow description such as a source Internet Protocol (IP) address, a source port, a destination IP address, and a destination port. Then, PCRF 608 may communicate with Subscription Profile Repository (SPR)/Home Subscriber Server (HSS) 610 to retrieve the QoS profile for the SPR (if needed) and determine the allocation and retention priority (ARP) level, pre-emption capability, and pre-emption vulnerability.

Further, PCRF 608 may communicate with packet data network gateway (PGW) 612 to provision policy and charging control (PCC) rules to the PCEF. The provisioned PCC rules include service data flows filters, QoS parameters, a QoS class identifier (QCI), and ARP information (including a priority level, pre-emption capability, and pre-emption vulnerability). Afterwards, the evolved packet core (EPC) and evolved UMTS terrestrial radio access network (eU-TRAN) 614 set up dedicated bearers dynamically.

Figure 7:
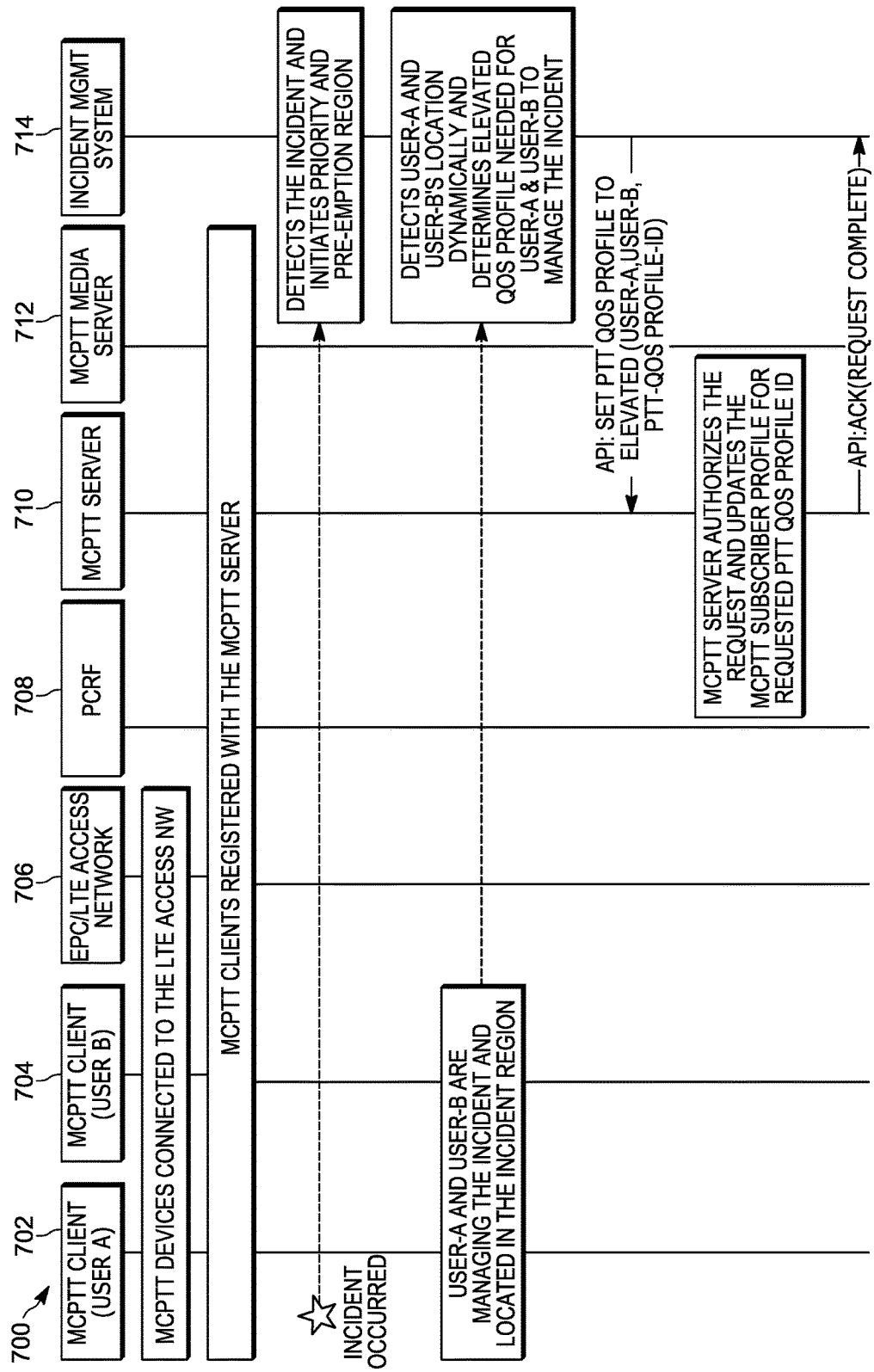
FIG. 7 illustrates an embodiment call flow for incident initiated priority and preemption setup for PTT users.

FIG. 7 illustrates an embodiment call flow 700 for incident initiated priority and preemption setup for PTT users. Initially, MCPTT Client Device 702 for User A and MCPTT Client Device 704 for User B are connected to LTE Access Network 706. MCPTT Client Devices 702 and 704 are also registered to MCPTT Server 710 and MCPTT Media Server 712 through PCRF 708. In FIG. 7, MCPTT Server 710 and MCPTT Media Server 712 are implemented on two different servers. A skilled artisan would recognize that MCPTT Server 710 and MCPTT Media Server 712 may be implemented on the same device as a single server.

After occurrence of an incident, Incident Management System 714 detects the incident and initiates priority and pre-emption region. When Client Devices 702 and 704, of User A and User B respectively, are located within the incident region and User A and User B are managing the incident, Incident Management System 714 detects the locations of Client Devices 702 and 704 dynamically. Incident Management System 714 then determines that an elevated QoS profile is needed for Client Devices 702 of User A and Client Device 704 of User B to manage the incident. Then, Incident Management System 714 uses an API to request MCPTT server 710 to set the PTT QoS profile to be elevated for Client Devices 702 of User A and Client Device 704 of User B with a PTT QoS profile identifier (ID). After MCPTT server 710 authorizes the request, MCPTT server 710 may update the MCPTT subscriber profile for the requested QoS profile ID and use the API to send an acknowledgement message to Incident Management System 714. The acknowledgement message indicates that MCPTT server 710 has completed the request sent from Incident Management System 714.

Figure 8:
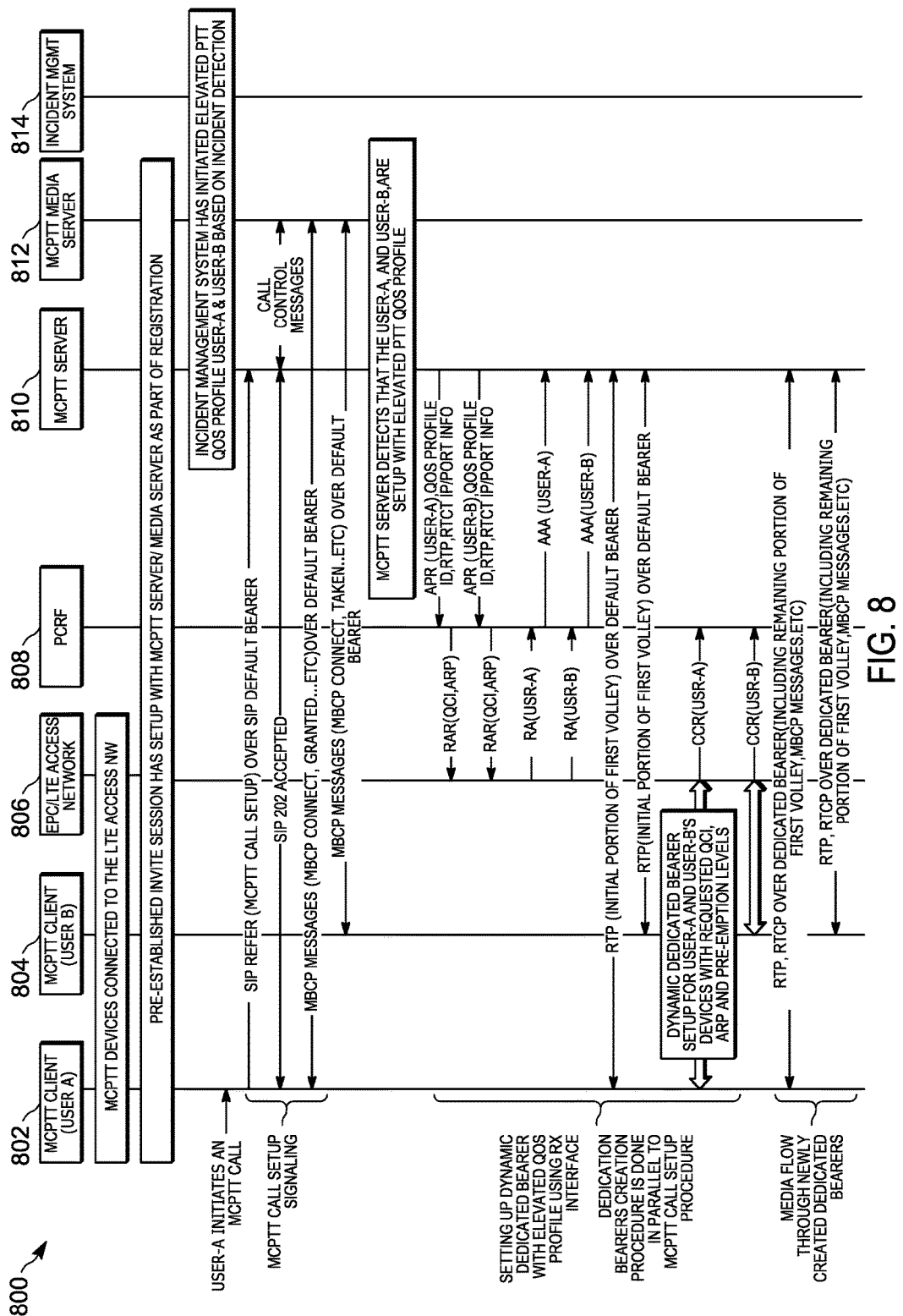
FIG. 8 illustrates an embodiment call flow for MCPTT call setup during incident with elevated quality of service (QoS) for a 1-1 call.

FIG. 8 illustrates an embodiment call flow 800 for MCPTT call setup during incident with elevated QoS for a 1-1 call. MCPTT Client Device 802 for User A and MCPTT Client Device 804 for User B are connected to LTE Access Network 806. There is also a pre-established INVITE session between MCPTT Client Devices 802 and 804, and MCPTT Server 810 and MCPTT Media Server 812, through PCRF 808, as a part of the registration. In FIG. 8, MCPTT Server 810 and MCPTT Media Server 812 are implemented on two different servers. A skilled artisan would recognize that MCPTT Server 810 and MCPTT Media Server 812 may be implemented on the same device as a single server.

Based on incident detection, Incident Management System 814 has initiated an elevated PTT QoS profile for MCPTT Client Device 802 for User A and MCPTT Client Device 804 for User B. Client Device 802 may initiate an MCPTT call. For MCPTT call setup signaling, MCPTT Client Device 802 may send a SIP Refer message to MCPTT Server 810 over the SIP default bearer. MCPTT Server 810 may return a SIP "Accepted" response back to MCPTT Client Device 802. Afterwards, MCPTT Client Device 802 may exchange Media Burst Control Protocol (MBCP) messages with MCPTT Media Server 812. Similarly, MCPTT Client Device 804 may also exchange MBCP messages with MCPTT Media Server 812.

Later, MCPTT Server 810 detects that MCPTT Client Device 802 for User A and MCPTT Client Device 804 are set up with an elevated PTT QoS profile. Then, MCPTT Server 810 may set up dynamic dedicated bearer(s) with the elevated QoS profile using the Rx interface. MCPTT Server 810 may send AAR information with respect to MCPTT Client Device 802 for User A (including the QoS profile ID, RTP, RTCP IP and port information) to PCRF 808. In turn, PCRF 808 sends the corresponding Re-Auth-Request (RAR) to LTE Access Network 806. Similarly, MCPTT Server 810 may send AAR information with respect to MCPTT Client Device 804 (including the QoS profile ID, RTP, RTCP IP and port information) to PCRF 808. In turn, PCRF 808 sends the corresponding RAR to LTE Access Network 806. LTE Access Network 806 may return Re-Auth-Answers (RAAs) for MCPTT Client Device 802 for User A and MCPTT Client Device 804 to PCRF 808, and PCRF 808 may return AA-Answers (AAAs) for MCPTT Client Device 802 for User A and MCPTT Client Device 804 to MCPTT Media Server 812.

The dedicated bearer creation procedure is performed in parallel to the MCPTT call setup procedure. The RTP between MCPTT Client Device 802 and MCPTT Server 810 is initially over the default bearer. Similarly, the RTP between MCPTT Client Device 804 and MCPTT Server 810 is initially over the default bearer. Then, LTE Access Network 806 dynamically sets up the dedicated bearer with the requested QCI, ARP, and pre-emption levels. LTE Access Network 806 may also return the Credit Control Request-Update (CCR-U) for Client Device 802 of User A and CCR-U for Client Device 804 of User B to PCRF 808. Afterwards, the RTP and RTCP between MCPTT Client Device 802 and MCPTT Server 810 are over the dedicated bearer. Similarly, the RTP and RTCP between MCPTT Client Device 804 and MCPTT Server 810 are over the dedicated bearer.

Figure 9:
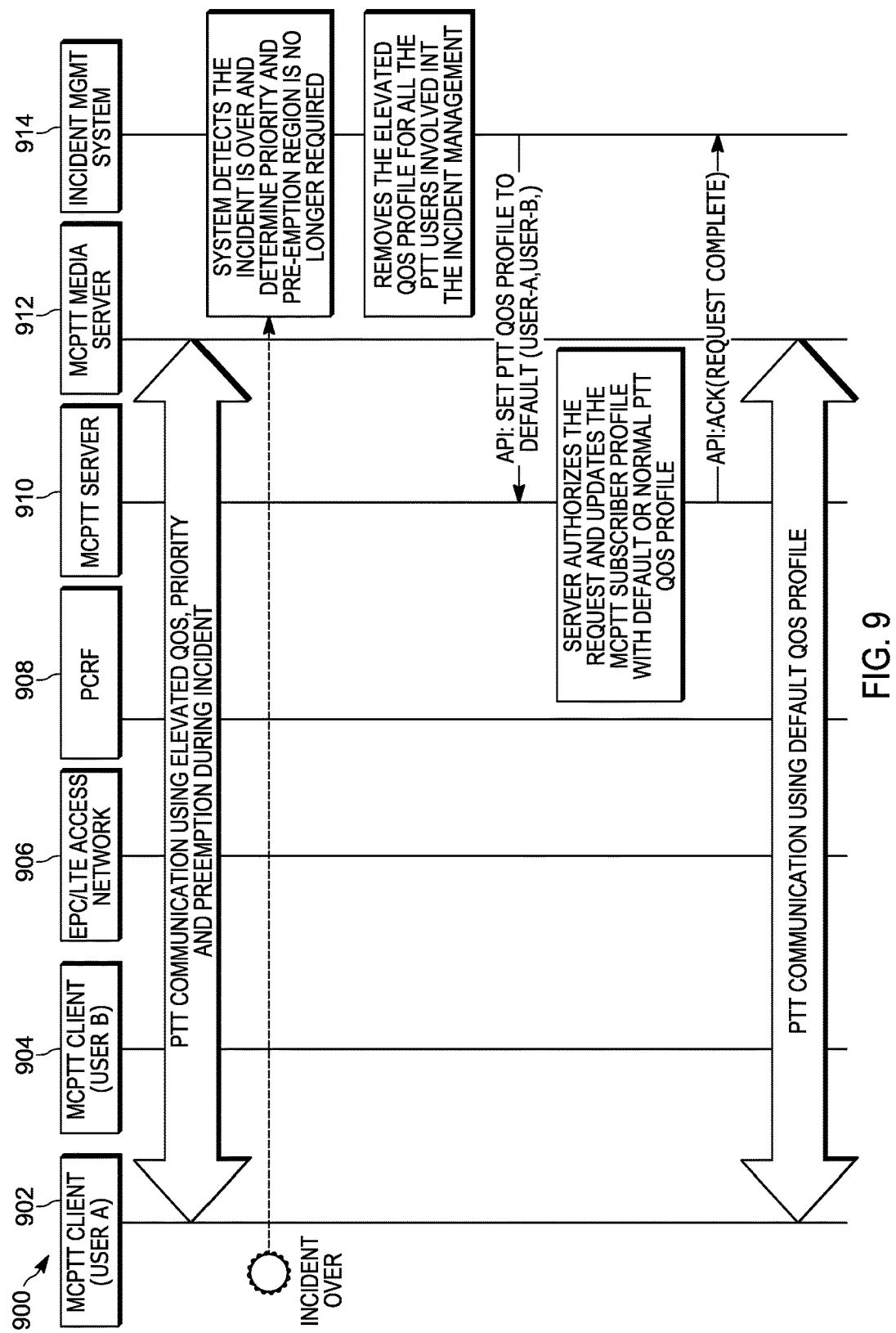
FIG. 9 illustrates an embodiment call flow of incident-initiated priority and preemption teardown.

FIG. 9 illustrates an embodiment call flow 900 of incident-initiated priority and preemption teardown. During the incident, the PTT communication between MCPTT Client Devices 902 and 904 (via LTE Access Network 906, PCRF 908, MCPTT Server 910, and MCPTT Media Server 912) is using the elevated QoS profile. After Incident Management System 914 detects that the incident is over, Incident Management System 914 determines that the priority and preemption region is no longer needed. Incident Management System 914 then removes the elevated QoS profile for all the client devices of the PTT users involved in the incident management. Next, Incident Management System 914 uses an API to request MCPTT Server 910 to set the PTT QoS profile for Client Device 802 of User A and Client Device 804 of User B to default QoS settings. MCPTT Server 910 authorizes the request and updates the MCPTT subscriber profile with the default PTT QoS profile. MCPTT Server 910 may also use the API to send an acknowledge message to Incident Management System 914. The acknowledge message indicates that MCPTT Server 910 has completed the request. Afterwards, the PTT communication between MCPTT Client Devices 902 and 904 uses the default QoS profile.

Emergency Alerts

An embodiment implementation of Emergency Alert feature includes support Initiation and Cancelation of the Emergency Alerts. An authorized User can initiate an Emergency Alert to another PTT user or a Group. Initiating an Emergency Alert establishes the Emergency State of the Originating user. The user can send Emergency Cancelation Alert to notify other users that Emergency situation is ended. Emergency Alert Initiation and Cancellation may be triggered by situational awareness engine.

Location Data Reporting Frequency

In an embodiment location data reporting frequency can be client device specific. A client device can have different frequency and granularity to collect location information and a different frequency and granularity to communicate the location information to the server. The client device can collect location information at a finer granularity and a higher frequency. However, the client device may not send the location information to the server at the same granularity that it collects the location information. RAN usage can be optimized by the client device for reducing the frequency and granularity of location reporting when the client device is not in emergency situation. The change in frequency and granularity of location reporting on the client device can be done in real time. Based on the inputs from the situational awareness engine, the MCPTT can prioritize the location information coming from a subset of those client devices which are closer to the on-going emergency situations.

Group Management

Embodiments may support group management. The situational awareness function has a constant stream of data inputs related to the on-going emergencies at any time. Depending on the nature of the emergencies, the situational awareness function instructs the group management function to affiliate and de-affiliate users to various groups based on the emergency. For example, in case of a fire related emergency in an area, fire, police, paramedics and any other related public safety agencies can be automatically affiliated to the firefighting agency group. This will ensure that all the agencies can be kept abreast of the developing emergency. The MCPTT server can perform the deaffiliation of the groups once the emergency situation is over. Situational awareness engine can define groups for various geographical areas within its jurisdiction. These groups are meant to communicate local events occurring within those defined geographic areas. So if any authorized personnel are present in the area, they can be automatically affiliated to the local groups in that area. The system can perform automatic deaffiliation when the personnel exit that geographical area. The 3GPP mission critical services specification has location triggers defined for "Entry into a Geographical Area" and "Exit from a Geographical Area" and these triggers can be used for automatic affiliation and deaffiliation.

Temporary Groups

Embodiments may support temporary groups. The situational awareness function has a constant stream of data inputs related to the on-going emergencies at any time. Depending on the nature of the emergencies, the situational awareness function may instruct the group management function to create a temporary group based on the emergency. For example, in case of a traffic accident in an area, fire, police, paramedics, and any other related public safety agencies can be automatically re-grouped in one temporary group. This will ensure that all the agencies can be communicated with each other during the on-going emergency. The MCPTT server can remove the temporary formed group once the emergency is over.

Call Continuity and Automatic Role Delegation

Embodiment systems may support call continuity during on-network to off-network transition and vice-versa if the PTT client is able to reconnect to the server using a Proximity Services (ProSe) UE to Network relay. When a PTT client goes out of coverage area, it attempts to locate a ProSe UE relay device and re-registers to the embodiment system's MCPTT server after it is connected to the EPC. When the PTT client re-registers to the embodiment PTT system, it is automatically rejoined into the ongoing PTT call. Also, when the MCPTT server detects that the PTT client is unreachable during a call and the presence status of this PTT client is notified to the other participants of the call. The 'PTT client unreachable' event may also trigger the situational awareness engine of the embodiment PTT system to automatically delegate the role performed by the unreachable PTT client to one of the other available users.

Ambient Listening

Embodiment situational awareness engine can automatically turn ambient listening on for emergency situations on behalf of the dispatcher.

Call Priorities

The situational awareness function has details about the type of emergencies. This data can be used for priority and preemption. For example, if a temporary group is created for a police emergency, priority can be provided to the police over fire and other agencies which are also a part of the temporary group.

User Role and User Profile Assignment

Embodiment systems may allow a MCPTT User ID to be associated with multiple service access profiles. MCPTT user may use multiple PTT devices to access the service and a different service access profile may be associated with each PTT device. An embodiment PTT System provides the capability to dynamically modify the service access profile of the users using a situational awareness engine. Situational awareness engine has the capability to automatically assign and modify the privilege level and service access profiles for the users based on pre-defined triggers. Aspects of the functionality include role profile configuration. This includes configuration of admin role hierarchy, pre-defined service access profiles, and delegation of authority to admins and users to manage role profiles and role assignment. Aspects of the functionality also include rule based profile assignment wherein the rules are based on user actions (e.g. emergency call), identity, time-of-day, user mobility, and user inactivity, etc. Aspects of the functionality may further include real time analytics to collect user activity reports and trigger appropriate rules on detection of occurrence of a trigger event.

Figure 10:
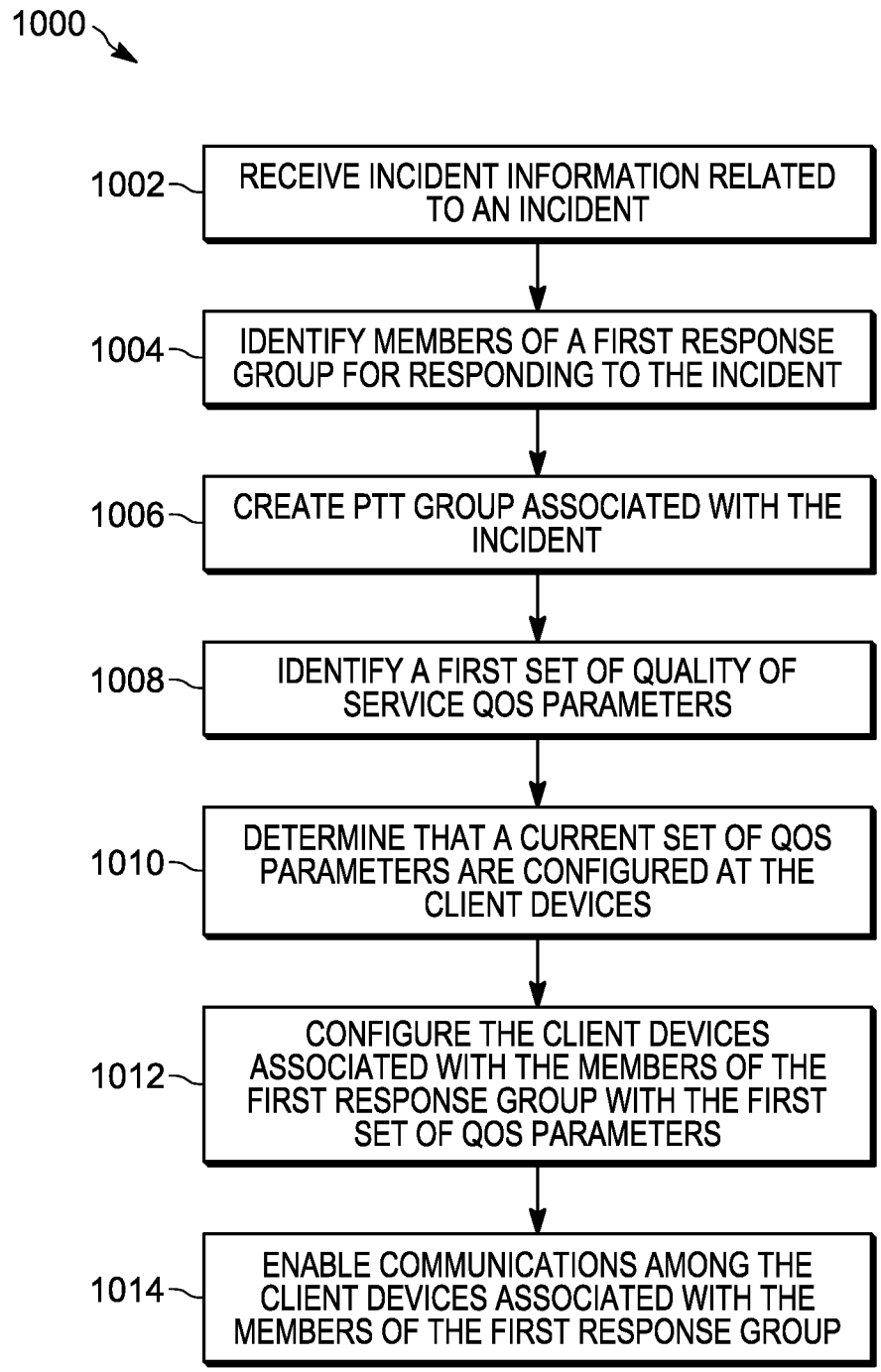
FIG. 10 is a flowchart of an embodiment method for a push-to-talk (PTT) server platform to perform situational awareness driven group communications.

FIG. 10 illustrates an exemplary flowchart of an embodiment method 1000 for a push-to-talk (PTT) server platform to perform situational awareness driven group communications. The push-to-talk (PTT) server platform described in method 1000 may be PTT platform 106 described with respect to FIG. 1.

Method 1000 starts at operation 1002, where the PTT server platform receives incident information related to an incident. The PTT server platform may receive the incident information (also referred to as an incident response plan) from one or more data sources via a transceiver of the PTT server platform. The incident information comprises incident type, incident status, and incident location. The incident information may further include at least one of incident time, or special requirements to deal with the incident.

At operation 1004, the PTT server platform identifies members of a first response group for responding to the incident. The PTT server platform may identify members of the first response group based on the incident information and locations of client devices associated with the members of the first response group.

To identify the members of the first response group, the PTT server platform may first determine the type of personnel and the number of personnel required to handle the incident based on the incident information. Next, the PTT server platform may set up a geo-fence around the incident location. The geo-fence may comprise a zone diameter around the incident location. When locations of one or more client devices associated with one or more first responders are within the geo-fence, the server platform may associate the one or more first responders of the determined type of personnel with the first response group.

Further, the PTT server platform may determine the number of the associated one or more first responders of the determined type of personnel in the first response group. When the number of the associated one or more first responders is less than a threshold (e.g., number of personnel required to handle the incident based on the incident information), the PTT server platform may update the geo-fence by increasing the zone diameter of the geo-fence. When locations of additional client devices associated with the additional first responders are within the updated geo-fence, the PTT server platform may associate additional first responders of the determined type of personnel with the first response group.

In some embodiments, when the PTT server platform detects that the client device associated with a new first responder enters the geo-fence and the new first responder is of the determined personnel type to handle the incident based on the incident information, the PTT server platform may associate the new first responder with the first response group. Moreover, when the PTT server platform detects that a client device, associated with an existing member of the first response group, is exiting the geo-fence, the PTT server platform may disassociate the existing member from the first response group.

At operation 1006, the PTT server platform creates a PTT call group associated with the incident. The PTT server platform creates the PTT call group for the client devices associated with the members of the first response group.

At operation 1008, the PTT server platform identifies a first set of quality of service (QoS) parameters. The PTT server platform may identify the first set of QoS parameters for supporting communications associated with the incident. In one embodiment, priority for various users and various types of communications are indicated in the incident response plan.

At operation 1010, the PTT server platform determines that a current set of QoS parameters are configured at the client devices associated with the members of the first response group. The current set of QoS parameters may be at a different priority level than the first set of QoS parameters. For example, the current set of QoS parameters may be at a lower priority level than the first set of QoS parameters. In another example, if the current QoS parameters are already at the desired or a higher priority level, no further action is required to be triggered by the situational awareness engine.

At operation 1012, the PTT server platform configures the client devices associated with the members of the first response group with the first set of QoS parameters.

At operation 1014, the PTT server platform enables communications among the client devices associated with the members of the first response group. The PTT server platform may enable communications within the PTT call group using the first set of QoS parameters.

In some embodiments, the PTT server platform may reserve network resources on a wireless network for the incident. The network resources may be broadcast resources. The network resources may also be unicast resources. Data transmission may use unicast resources when the multicast or broadcast facilities are not available in the network, or when a user's client device does not have the capabilities to receive multicast or broadcast transmissions. The PTT server platform may also identify at least one of static data sources or dynamic feeds relevant to the incident. The PTT server platform may then transmit data from the identified at least one of static data sources or dynamic feeds to the client devices associated with the members of the first response group. The PTT server platform may use the first set of QoS parameters over the reserved broadcast resources to transmit the data.

In some embodiments, the PTT server platform may identify members of a second response group for responding to the incident. The PTT server platform may identify members of the second response group based on the incident information and locations of client devices associated with the members of the second response group. The PTT server platform may identify a second set of quality of service (QoS) parameters for supporting communications associated with the incident. The PTT server platform may identify the second set of QoS parameters based on the incident type and the incident status. Then, the PTT server platform may enable communications among the members of the second response group within the PTT call group using the second set of QoS parameters.

In one embodiment, each message for communications among the members of the first response group within the PTT call group is labelled with an incident identifier (ID).

After the incident is over, in some embodiments, the PTT server platform may detect that that the incident status indicates that the incident is over. Then, the PTT server platform may configure the client devices associated with the members of the first response group with a default set of QoS parameters. Next, the PTT server platform may configure may disassociate the members of the first response group from the first call group.

Figure 11:
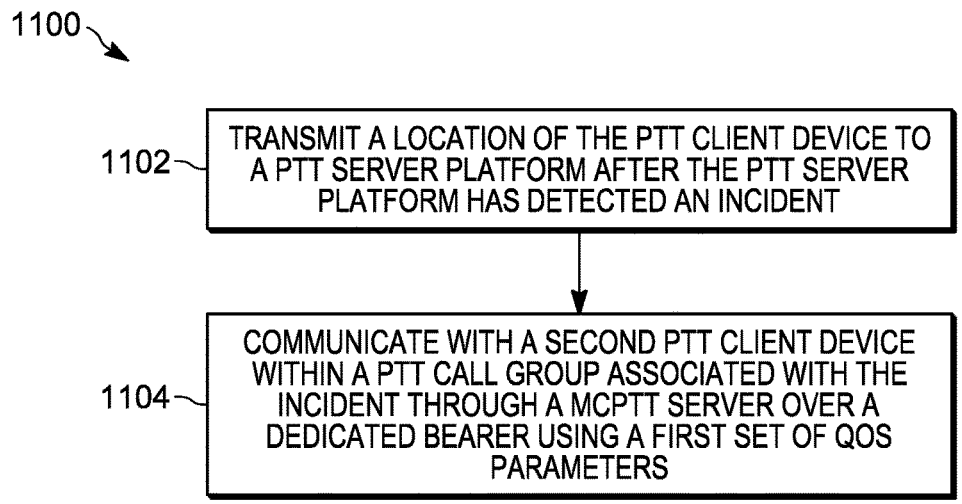
FIG. 11 is a flowchart of an embodiment method for a push-to-talk (PTT) client device to perform situational awareness driven group communications.

FIG. 11 illustrates an exemplary flowchart of an embodiment method 1100 for a push-to-talk (PTT) client device to perform situational awareness driven group communications. The push-to-talk (PTT) client device described in method 1100 may be client device 102 described with respect to FIG. 1.

Method 1100 starts at operation 1102, where the PTT client device transmits a location of the PTT client device to a PTT server platform. The PTT client device transmits the device location via a transceiver of the PTT client device. Further, the PTT client device may transmit the device location after the PTT server platform has detected an incident.

The PTT client device is associated with a member of a first response group for responding to the incident based on the transmitted location of the PTT client device and incident information related to the incident. The incident information may comprise incident type, incident status, and incident location.

In one embodiment, the PTT client device may receive an emergency alert message. The emergency alert message indicates that the incident has occurred. The emergency alert message comprises information related to a geo-fence. The information related to the geo-fence comprises a zone diameter around the incident location. The PTT client device may determine whether the PTT client device is within the geo-fence based on a location of the PTT client device and the zone diameter around the incident location. Then, the PTT client device may transmit information indicating whether the PTT client device is within the geo-fence to the PTT server platform.

In another embodiment, the PTT client device may transmit information indicating that the PTT client device has detected occurrence of the incident to the PTT server platform.

At operation 1104, the PTT client device communicates with a second PTT client device within a PTT call group associated with the incident. The PTT client device may communicate with the second PTT client device via the transceiver of the PTT client device through a mission critical push to talk (MCPTT) server over a dedicated bearer using a first set of quality of service (QoS) parameters. Both the PTT client device and the second PTT client device. The first set of QoS parameters may be identified based on the incident type and the incident status. Before the PTT server platform detected the incident, the PTT client device may be configured with a current set of QoS parameters. The current set of QoS parameters may be at a different priority level than the first set of QoS parameters. For example, the current set of QoS parameters may be at a lower priority level than the first set of QoS parameters.

In one embodiment, the PTT client device may receive data from at least one of static data sources or dynamic feeds relevant to the incident over the dedicated bearer using the first set of QoS parameters.

In some embodiments, the PTT client device may move outside the geo-fence. The PTT client device may transmit a second location of PTT client device to the PTT server platform after moving outside the geo-fence. Then, the PTT client device may communicate with the second PTT client device via the MCPTT server over a default bearer using a default set of QoS parameters.

Figure 12:
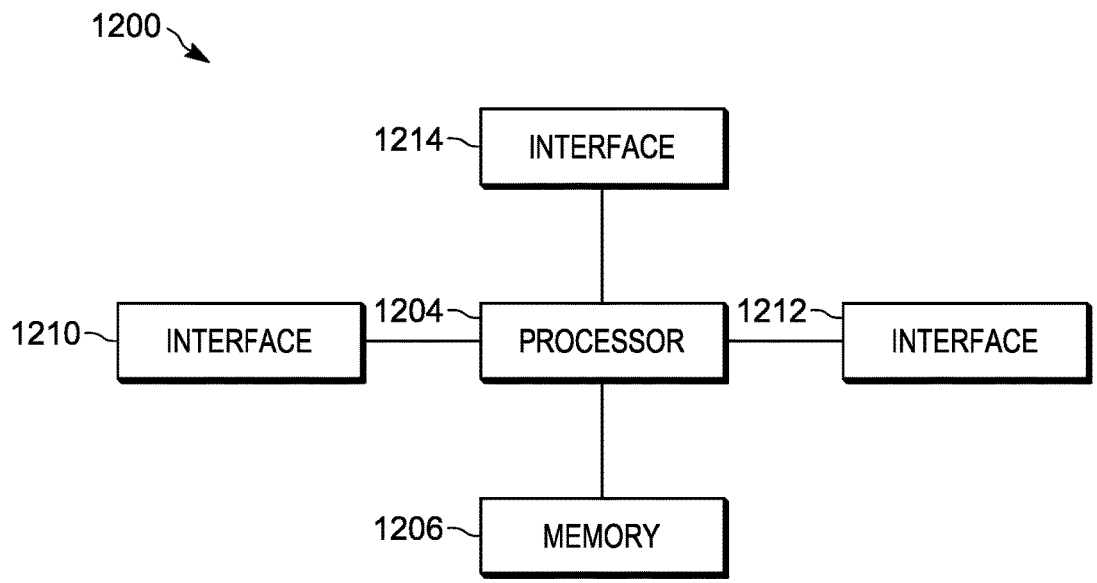
FIG. 12 illustrates a block diagram of an embodiment processing system for performing methods described herein.
Figure 13:
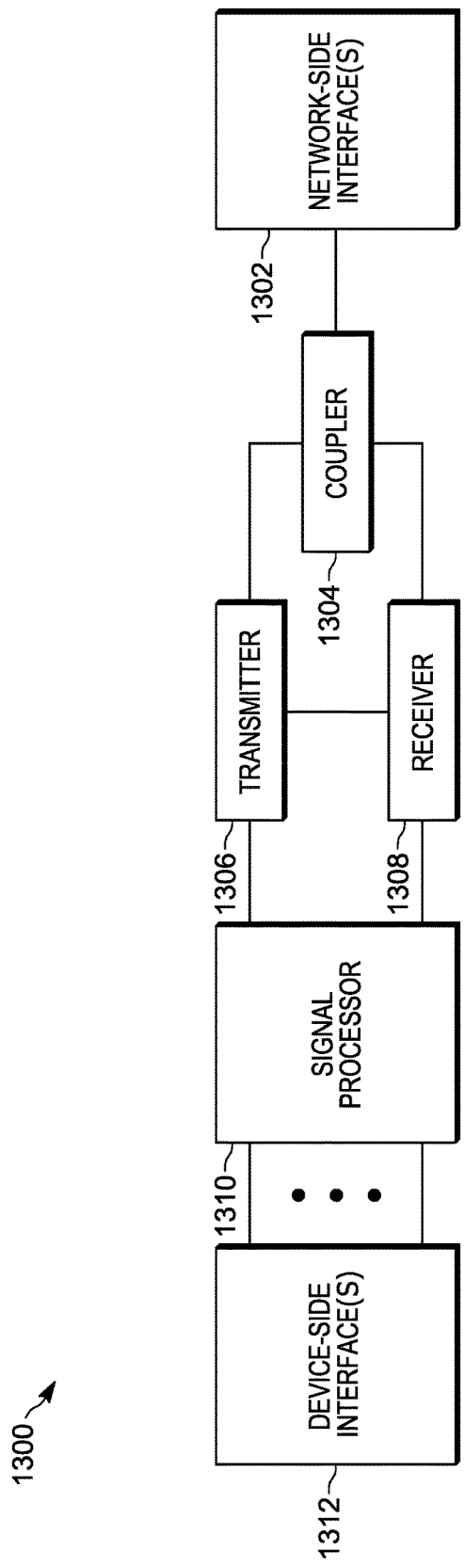
FIG. 13 illustrates a block diagram of a transceiver adapted to transmit and receive signaling over a telecommunications network.

FIG. 12 illustrates a block diagram of an embodiment processing system 1200 for performing methods described herein, which may be installed in a host device. As shown, the processing system 1200 includes an electronic processor 1204, a memory 1206, and interfaces 1210-1214, which may (or may not) be arranged as shown in FIG. 13. The electronic processor 1204 may be any component or collection of components adapted to perform computations and/or other processing related tasks, and the memory 1206 may be any component or collection of components adapted to store programming and/or instructions for execution by the electronic processor 1204. In an embodiment, the memory 1206 includes a non-transitory computer readable medium. The interfaces 1210, 1212, and 1214 may be any component or collection of components that allow the processing system 1200 to communicate with other devices/components and/or a user. For example, one or more of the interfaces 1210, 1212, 1214 may be adapted to communicate data, control, or management messages from the electronic processor 1204 to applications installed on the host device and/or a remote device. As another example, one or more of the interfaces 1210, 1212, 1214 may be adapted to allow a user or user device (e.g., personal computer (PC), etc.) to interact/communicate with the processing system 1200. The processing system 1200 may include additional components not depicted in FIG. 12, such as long term storage (e.g., non-volatile memory, etc.).

In some embodiments, the processing system 1200 is included in a network device that is accessing, or part otherwise of, a telecommunications network. In one example, the processing system 1200 is in a network-side device in a wireless or wireline telecommunications network, such as a base station, a relay station, a scheduler, a controller, a gateway, a router, an applications server, or any other device in the telecommunications network. In other embodiments, the processing system 1200 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

In some embodiments, one or more of the interfaces 1210, 1212, 1214 connects the processing system 1200 to a transceiver adapted to transmit and receive signaling over the telecommunications network.

FIG. 13 illustrates a block diagram of a transceiver 1300 adapted to transmit and receive signaling over a telecommunications network. The transceiver 1300 may be installed in a host device. As shown, the transceiver 1300 comprises a network-side interface 1302, a coupler 1304, a transmitter 1306, a receiver 1308, a signal processor 1310, and a device-side interface 1312. The network-side interface 1302 may include any component or collection of components adapted to transmit or receive signaling over a wireless or wireline telecommunications network. The coupler 1304 may include any component or collection of components adapted to facilitate bi-directional communication over the network-side interface 1302. The transmitter 1306 may include any component or collection of components (e.g., up-converter, power amplifier, etc.) adapted to convert a baseband signal into a modulated carrier signal suitable for transmission over the network-side interface 1302. The receiver 1308 may include any component or collection of components (e.g., down-converter, low noise amplifier, etc.) adapted to convert a carrier signal received over the network-side interface 1302 into a baseband signal. The signal processor 1310 may include any component or collection of components adapted to convert a baseband signal into a data signal suitable for communication over the device-side interface(s) 1312, or vice-versa. The device-side interface(s)

1312 may include any component or collection of components adapted to communicate data-signals between the signal processor 1310 and components within the host device (e.g., the processing system 1200, local area network (LAN) ports, etc.).

The transceiver 1300 may transmit and receive signaling over any type of communications medium. In some embodiments, the transceiver 1300 transmits and receives signaling over a wireless medium. For example, the transceiver 1300 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1302 comprises one or more antenna/radiating elements. For example, the network-side interface 1302 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1300 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:
1. A push-to-talk (PTT) server platform for situational awareness driven group communication, comprising:
a transceiver; and
one or more electronic processors configured to:
receive, via the transceiver, incident information related to an incident from one or more data sources, the incident information comprising incident type, incident status, and incident location;

identify members of a first response group for responding to the incident based on the incident information and locations of client devices associated with the members of the first response group, wherein the one or more electronic processors identify the members of the first response group by:
  determining a type and a number of personnel required to handle the incident based on the incident information;
  setting up a geo-fence around the incident location, the geo-fence comprising a zone diameter around the incident location; and
  associating one or more first responders of the determined type of personnel with the first response group when locations of one or more client devices associated with the one or more first responders are within the geo-fence;
create a PTT call group associated with the incident for the client devices associated with the members of the first response group;
identify, based on the incident type and the incident status, a first set of quality of service (QoS) parameters for supporting communications associated with the incident;
determine that a current set of QoS parameters are configured at the client devices associated with the members of the first response group, wherein the current set of QoS parameters are at a different priority level than the first set of QoS parameters;
configure the client devices associated with the members of the first response group with the first set of QoS parameters; and
enable communications among the client devices associated with the members of the first response group within the PTT call group using the first set of QoS parameters.

2. The PTT server platform of claim 1 the one or more electronic processors further configured to:
  detect that the incident status indicates that the incident is over;
  configure the client devices associated with the members of the first response group with a default set of QoS parameters; and
  disassociate the members of the first response group from the PTT call group.

3. The PTT server platform of claim 1, the one or more electronic processors further configured to:
  reserve network resources on a wireless network for the incident; and
  identify at least one of static data sources or dynamic feeds relevant to the incident.

4. The PTT server platform of claim 3, the one or more electronic processors further configured to:
  transmit data from the identified at least one of static data sources or dynamic feeds to the client devices associated with the members of the first response group using the first set of QoS parameters over the reserved network resources.

5. The PTT server platform of claim 1, wherein the incident information further comprises at least one of incident time, or special requirements to deal with the incident.

6. The PTT server platform of claim 1, the one or more electronic processors further configured to:
  determine a number of the associated one or more first responders of the determined type of personnel in the first response group; and
  when it is determined that the number of the associated one or more first responders is less than a threshold:
    update the geo fence by increasing the zone diameter of the geo-fence, and
    associate additional first responders of the determined type of personnel with the first response group when locations of additional client devices associated with the additional first responders are within the updated geo-fence.

7. The PTT server platform of claim 1, the one or more electronic processors further configured to:
  detect that a client device, associated with a new first responder of the determined type of personnel, enters the geo-fence; and
  associate the new first responder with the first response group.

8. The PTT server platform of claim 1, the one or more electronic processors further configured to:
  detect that a client device, associated with an existing member, of the first response group is exiting the geo-fence; and
  disassociate the existing member from the first response group.

9. The PTT server platform of claim 1, the one or more electronic processors further configured to:
  identify members of a second response group for responding to the incident based on the incident information and locations of client devices associated with the members of the second response group;
  identify, based on the incident type and the incident status, a second set of QoS parameters for supporting communications associated with the incident; and
  enable communications among the members of the second response group within the PTT call group using the second set of QoS parameters.

10. The PTT server platform of claim 1, wherein each message for communications among the members of the first response group within the PTT call group is labelled with an incident identifier (ID).

11. The PTT server platform of claim 1, the one or more electronic processors further configured to:
  detect that a first client device associated with one of the members of the first response group is out of reach;
  delegate a role performed by the first client device to a second client device; and
  configure the second client device with the first set of QoS parameters.

12. A push-to-talk (PTT) client device, comprising:
  a transceiver; and
  a processor coupled to the transceiver, the processor configured to:
  transmit, via the transceiver, a location of the PTT client device to a PTT server platform after the PTT server platform has detected an incident;
  receive an emergency alert message indicating that the incident has occurred, the emergency alert message comprising information related to a geo-fence, wherein the information related to the geo-fence comprises a zone diameter around the incident location, and the processor is further configured to:
    determine whether the PTT client device is within the geo-fence based on a location of the PTT client device and the zone diameter around the incident location; and
    transmit, to the PTT server platform, information indicating whether the PTT client device is within the geo-fence; and communicate, via the transceiver, with a second PTT client device within a PTT call group associated with the incident via a mission critical push to talk (MCPTT) server over a dedicated bearer using a first set of quality of service (QoS) parameters, wherein:

the PTT client device was configured with a current set of QoS parameters before the PTT server platform detected the incident, the current set of QoS parameters being at a different priority level than the first set of QoS parameters, the PTT client device is associated with a member of a first response group for responding to the incident based on the transmitted location of the PTT client device and incident information related to the incident, the incident information comprising incident type, incident status, and incident location, and the first set of QoS parameters are identified based on the incident type and the incident status.

13. The PTT client device of claim 12, the processor further configured to:

receive data from at least one of static data sources or dynamic feeds relevant to the incident over the dedicated bearer using the first set of QoS parameters.

14. The PTT client device of claim 12, wherein the PTT client device moves outside a geo-fence, and the processor is further configured to:

transmit, to the PTT server platform, a second location of PTT client device; and communicate with the second PTT client device via the MCPTT server over a default bearer using a default set of QoS parameters.

15. The PTT client device of claim 12, wherein the PTT server platform detects that the incident status indicates that the incident is over, and the processor is further configured to:

communicate with the second PTT client device via the MCPTT server over a default bearer using a default set of QoS parameters.

16. The PTT client device of claim 12, the processor further configured to:

label a message with an incident identifier (ID); and transmit the labelled message to the second PTT client device via the MCPTT server over the dedicated bearer using the first set of QoS parameters.

17. The PTT client device of claim 12, the processor further configured to:

transmit, to the PTT server platform, information indicating that the PTT client device has detected occurrence of the incident.

18. A method for situational awareness driven group communication, comprising:

receiving, by a push-to-talk (PTT) server platform implemented on one or more computing devices, incident information related to an incident from one or more data sources, the incident information comprising incident type, incident status, and incident location;

identifying members of a first response group for responding to the incident based on the incident information and locations of client devices associated with the members of the first response group, wherein identifying the members of the first response group further comprises:

determining a type and a number of personnel required to handle the incident based on the incident information;

setting up a geo-fence around the incident location, the geo-fence comprising a zone diameter around the incident location; and associating one or more first responders of the determined type of personnel with the first response group when locations of one or more client devices associated with the one or more first responders are within the geo-fence;

creating a PTT call group associated with the incident for the client devices associated with the members of the first response group;

identifying, based on the incident type and the incident status, a first set of quality of service (QoS) parameters for supporting communications associated with the incident;

determining that a current set of QoS parameters are configured at the client devices associated with the members of the first response group, wherein the current set of QoS parameters are at a different priority level than the first set of QoS parameters;

configuring the client devices associated with the members of the first response group with the first set of QoS parameters; and enabling communications among the client devices associated with the members of the first response group within the PTT call group using the first set of QoS parameters.

* * * * *